United States Patent [19]
Koslov

[11] Patent Number: 6,044,112
[45] Date of Patent: Mar. 28, 2000

[54] METHODS AND APPARATUS FOR CORRECTING AMPLITUDE AND PHASE IMBALANCES IN DEMODULATORS

[75] Inventor: Joshua L. Koslov, Hopewell, N.J.

[73] Assignee: Hitachi America, Ltd., Tarrytown, N.Y.

[21] Appl. No.: 08/887,914

[22] Filed: Jul. 3, 1997

[51] Int. Cl.[7] .............................. H03H 7/30; H03H 7/40; H03K 5/159
[52] U.S. Cl. ............................................ 375/235; 375/284
[58] Field of Search ................................. 375/284, 278, 375/329, 235; 329/304

[56] References Cited

U.S. PATENT DOCUMENTS

| | | | |
|---|---|---|---|
| 4,475,088 | 10/1984 | Beard | 331/25 |
| 4,622,694 | 11/1986 | Weber et al. | 455/47 |
| 4,771,464 | 9/1988 | Kadin et al. | 381/13 |
| 4,882,614 | 11/1989 | Kageyama et al. | 358/12 |
| 4,947,454 | 8/1990 | Garner | 455/84 |
| 5,105,195 | 4/1992 | Conrad | 342/174 |
| 5,259,000 | 11/1993 | Kojima et al. | 375/8 |
| 5,369,411 | 11/1994 | Lisle, Jr. | 342/194 |
| 5,444,863 | 8/1995 | Torii | 455/83 |
| 5,524,124 | 6/1996 | Koenig | 375/229 |
| 5,621,455 | 4/1997 | Rogers et al. | 348/6 |
| 5,633,891 | 5/1997 | Rebec et al. | 375/219 |
| 5,692,013 | 11/1997 | Koslov et al. | 375/277 |
| 5,694,419 | 12/1997 | Lawrence et al. | 375/222 |
| 5,705,949 | 1/1998 | Alelyunas et al. | 329/304 |
| 5,754,591 | 5/1998 | Samueli et al. | 375/235 |
| 5,848,099 | 12/1998 | Benner | 375/226 |
| 5,949,821 | 9/1999 | Emami et al. | 375/235 |

OTHER PUBLICATIONS

"A 100MHz, 5MBaud QAM Decision–Feedback Equalizer for Digital Television Applications", Joshi et al., 1944 IEEE International Solid–State Circuits Conference.

Primary Examiner—Stephen Chin
Assistant Examiner—Phuong Phu
Attorney, Agent, or Firm—Straub & Pokotylo; Michael P. Straub

[57] ABSTRACT

Methods and apparatus for detecting and correcting phase and amplitude imbalances existing between I (in-phase) and Q (quadrature phase) signal components of a complex signal, e.g., QAM or OPSK signal, that is being demodulated are described. The phase and amplitude imbalance and correction circuitry of the present invention are implemented as decision directed control loops which can be used in conjunction with an overall decision directed gain control loop. Amplitude imbalance is corrected by adjusting the gain of one of the I and Q signal components. Phase imbalance is corrected by adding a portion of one of the I and Q signal components to the other one of the I and Q signal components. Overall amplitude control is achieved by adjusting the gain of both the I and Q signal components by the same amount. Various embodiments of the present invention utilize I/Q differential amplification and cross coupling to compensate for amplitude or phase imbalance with amplitude and phase correction factors being calculated in an automatic closed loop fashion by examining sliced errors and the location of their corresponding target symbols. The present invention is well suited for use, in, e.g., QPSK and/or QAM demodulators.

25 Claims, 6 Drawing Sheets

16-QAM
x=constellation point

METHODS AND APPARATUS FOR CORRECTING AMPLITUDE AND PHASE IMBALANCES IN DEMODULATORS

FIELD OF THE INVENTION

The present invention is directed to demodulator methods and apparatus and, more particularly, to methods and apparatus for correcting imbalances between in-phase and quadrature-phase signal components.

BACKGROUND OF THE INVENTION

The transmission of various types of information as digital data continues to grow in importance. Quadrature amplitude modulation (QAM) and Quadrature phase shift keying (QPSK) are increasingly seeing use as an attractive vehicle to transmit digital data.

As will be discussed in detail below, the methods and apparatus of the present invention may be used with QAM, QPSK and a variety of other types of modulated signals. Processing of these various types of modulated signals, both at the time of signal generation, e.g., at modulation time prior to signal transmission and, subsequently, e.g., upon receipt, often involves separate processing of in-phase (I) and quadrature phase (Q) signal components of the complex signal being transmitted. As a result of the separate processing of the I and Q signal components, amplitude and phase imbalances may be introduced into these signal components making it more difficult to achieve a constellation lock and properly demodulate a received signal than would otherwise by possible. The introduction of amplitude and phase imbalances is particularly prevalent where analog circuitry is used for separately processing the I and Q signal components. The use of some analog circuitry for the processing of I and Q signal components is common in many known QAM modulator and demodulator designs.

In order to reduce the effect of amplitude and phase imbalances, there is a need for methods and apparatus for reducing and/or correcting such imbalances.

For purposes of explanation, the methods and apparatus of the present invention will be explained in the context of an exemplary QAM demodulator embodiment. QAM and known QAM carrier recovery circuits will now be briefly discussed.

In essence, QAM relies on transmitting data as a sequence of two-dimensional complex symbols, i.e. with both in-phase and quadrature (I and Q) components. Each symbol, based upon the data it represents, takes on a specific pre-defined value. A set of all of the values available for transmission defines an alphabet which, when graphically plotted, typically on a two-dimensional basis, forms a constellation. The size and shape of the constellation depends upon the number of discrete values in the set and their spatial location in the constellation. In many cases the symbols in a constellation, when plotted, form a square pattern as is the case with 16 QAM signals wherein each complex symbol corresponds to one of 16 distinct values (states).

FIG. 1 illustrates a 16-QAM constellation 100. Each symbol in the constellation is denoted by an "x". In known 16 QAM the permissible nominal symbol values for both the x and y coordinates is (±1, ±3) with the nominal squared magnitude being approximately 2, 10 and 18. When the constellation 100 is spinning, e.g., before carrier lock is achieved, the constellation appears to contain three rings corresponding to the squared symbol magnitudes 2, 10, and 18 of which only the inner most and middle rings 113, 117, respectively, are specifically shown. Note that the constellation points represents by an "x" form a square pattern with 4 constellation points falling in each one of the four different signal quadrants 1, 2, 3, 4.

To receive broadcast QAM data, a QAM receiver essentially samples and filters a received output of a communication channel and applies resulting filtered samples to a decoder (e.g. a Viterbi decoder). The decoder normally contains one or more slicers used to yield detected symbols. The data contained in these later symbols, if it contains compressed video information, is then appropriately decompressed to yield original source video data. To specifically accomplish QAM reception, a QAM demodulator within a receiver performs the functions of timing recovery, equalization and carrier recovery.

In QAM and QPSK, carrier recovery is typically performed on a decision directed basis and in the absence of a pilot tone. Carrier recovery creates a reference carrier against which in-phase and quadrature modulated components may be determined, e.g., both in terms of frequency and phase, such that the received demodulated symbols do not rotate. It is the carrier signal that is quadrature modulated by the symbols and then transmitted to a receiver. In order for carrier recovery to properly function, the amplitude and phase imbalances between the received I and Q components of a QAM signal must be relatively small so that a frequency lock may be achieved between the reference carrier and the demodulated symbols.

In some known implementations of quadrature amplitude modulation (QAM) modulators and demodulators, differences in amplitudes between the in-phase (I) and quadrature phase (Q) signal components can exist. Differences in amplitude between I and Q signal components is sometimes referred to as amplitude imbalance or unbalance. In addition to amplitude imbalance, phase imbalance may also occur between I and Q signal components. Phase imbalance occurs when the I and Q signal components are not in perfect quadrature, i.e., the signals are not 90 degrees to each other. When amplitude and/or phase imbalance occurs, a received signal will have a reduced noise threshold because the received symbols will be in the wrong place and nearer to the slicer decision thresholds of incorrect symbol boxes. Accordingly, reduced slicer performance may result from amplitude and/or phase imbalances. In addition, other receiver circuits that depend upon correct decisions, e.g., a decision directed automatic gain control circuit, carrier recovery circuits and/or equalizer update circuits, may also exhibit reduced performance in the presence of amplitude and/or phase imbalance.

FIGS. 2A and 2B illustrate the effect of amplitude imbalances on the shape of a symbol constellation. In addition, FIGS. 3A and 3B illustrate the effect of phase imbalances on the shape of a symbol constellation. Note than in FIGS. 2A, 2B, 3A and 3B, dashed lines are used to illustrate the ideal shape of the symbol constellation. In the same figures, solid lines are used to illustrate the distorted shape of the symbol constellation resulting from the particular amplitude or phase imbalance being illustrated.

In FIG. 2A, the Q component is too small relative to the ideal, e.g., sliced symbol values. In FIG. 2B the Q component is too large relative to the ideal, e.g., sliced symbol values. Note that in either case, the constellation assumes a rectangular, as opposed to a square, shape. The orientation of the rectangle is indicative of the type of amplitude correction required.

FIGS. 3A and 3B illustrate the distorting effect that phase imbalances can have on the shape of a symbol constellation.

Note that the phase imbalances cause the symbol constellation's normally square shape to assume one of two possible diamond shaped patterns.

Various known systems attempt to keep amplitude and phase imbalances between real (I) and imaginary (Q) signal components small through the use of relatively accurate circuitry, e.g., in both the transmitter and receiver. This requirement for a high degree of accuracy in transmitter and demodulator system components adds to the cost of such known systems and fails to provide for any means of correcting or compensating for such imbalances when they occur.

FIG. 4 illustrates part of a known demodulator system 400. The input to the system 400 is a received complex signal representing a plurality of symbols. The input signal may be, e.g., the output of an equalizer.

The known system 400 comprises two basic loops, an inner carrier recovery loop formed by a mixer 404, a slicer 406 and a carrier recovery circuit 410 coupled together as illustrated in FIG. 4. The mixer 404 receives a complex signal including, e.g., symbols, and mixes them with the complex carrier recovery circuit output signal to generate a series of derotated symbols. When the carrier recovery circuit 410 achieves a frequency lock, the constellation represented by the symbols included in the output of the mixer 404 stop rotating allowing for proper decoding of the received symbols. In the FIG. 4 embodiment, the slicer 406 compares the values of the symbols output by the mixer 404 to a set of target or ideal values. In the case of 16 QAM, for each received symbol, a comparison is made between the received symbol value and a set of 16 possible target values. For each received symbol, the slicer 206 outputs a sliced symbol value $Z_{SL}$ which is the target symbol value that is closest to the received symbol value. The output of the carrier recovery circuit 410 is determined as a function of both the received and target symbol values. Since the carrier recovery output signal is a function of the decision made by the slicer 406, the signal is sometimes referred to as a decision directed carrier recovery signal.

As discussed above, the demodulator system 400 also includes an outer overall amplitude control loop. This outer loop is formed by a half-complex multiplier 402, the mixer 404, the slicer 406 and an overall amplitude gain control circuit 408. The overall amplitude gain control circuit 408 generates a decision directed gain control signal as a function of the symbols output by the mixer 404 and the sliced symbols output by the slicer 406. This may be done, as is known in the art, by comparing the received and target symbol values and generating a gain control signal as a function thereof in an attempt to adjust the input signal level so that the output of the mixer will more closely approximate the target symbol values. Since the half-complex multiplier 402 applies the same gain to the I and Q signal components of a received complex signal, it normally has no effect on the amplitude or frequency imbalances that may exist between these two signal components.

While the illustrate demodulator system works well in many applications, it does not compensate for or correct, amplitude and/or phase imbalances. Accordingly, there is a need for methods and apparatus which can detect and correct or compensate for amplitude and/or phase imbalances between I and Q components of a modulated signal.

SUMMARY OF THE PRESENT INVENTION

As discussed above, the present invention is directed to demodulator methods and apparatus and, more particularly, to methods and apparatus for correcting imbalances between in-phase and quadrature-phase signal components.

In the detailed description which follows various method and apparatus for detecting and correcting phase and amplitude imbalances existing between I (in-phase) and Q (quadrature phase) signal components of a complex signal, e.g., QAM or OPSK signal that is being demodulated, are described. The phase and amplitude imbalance detection and correction circuitry of the present invention is implemented using decision directed control loops. These control loops can be used in conjunction with an overall decision directed gain control loop. Amplitude imbalance is detected and then corrected by adjusting the gain of at least one of the I and Q signal components. Phase imbalance is corrected by adding a portion of one of the I and Q signal components to the other one of the I and Q signal components.

Various embodiments of the present invention utilize I/Q differential amplification and cross coupling to compensate for amplitude or phase imbalance with amplitude and phase correction factors being calculated in an automatic closed loop fashion by examining sliced errors and the location of their corresponding target symbols. The present invention is well suited for use in, e.g., QPSK and/or QAM demodulators.

By reducing and/or correcting phase and/or amplitude imbalances in accordance with the present invention, greater noise immunity can be achieved than would otherwise be possible. In addition, it may be possible to use less expensive circuitry when implementing modulators and demodulators in accordance with the present invention than would otherwise be possible. This is because the present invention provides methods and apparatus for reducing and/or correcting phase and amplitude imbalances that may result from the use of such circuitry.

Many other features and embodiments of the present invention are described in detail below.

BRIEF DESCRIPTION OF THE DRAWINGS

FIGS. 6, 6A, and 6B are a more detailed illustration of the demodulator illustrated in FIG. 5.

DETAILED DESCRIPTION

As discussed above, the present invention relates to methods and apparatus for correcting imbalances between in-phase and quadrature-phase signals in a demodulator.

Figure 1:
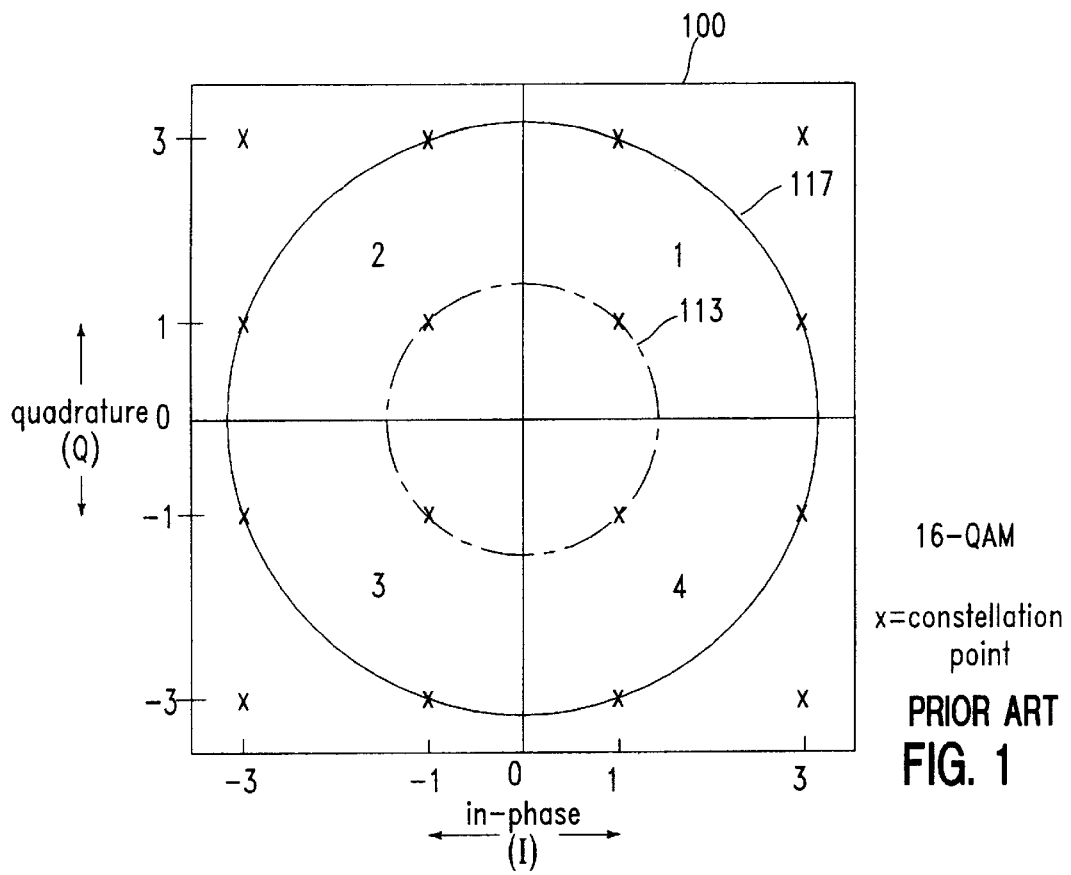
FIG. 1 is a diagram illustrating a 16 QAM constellation.
Figure 4:
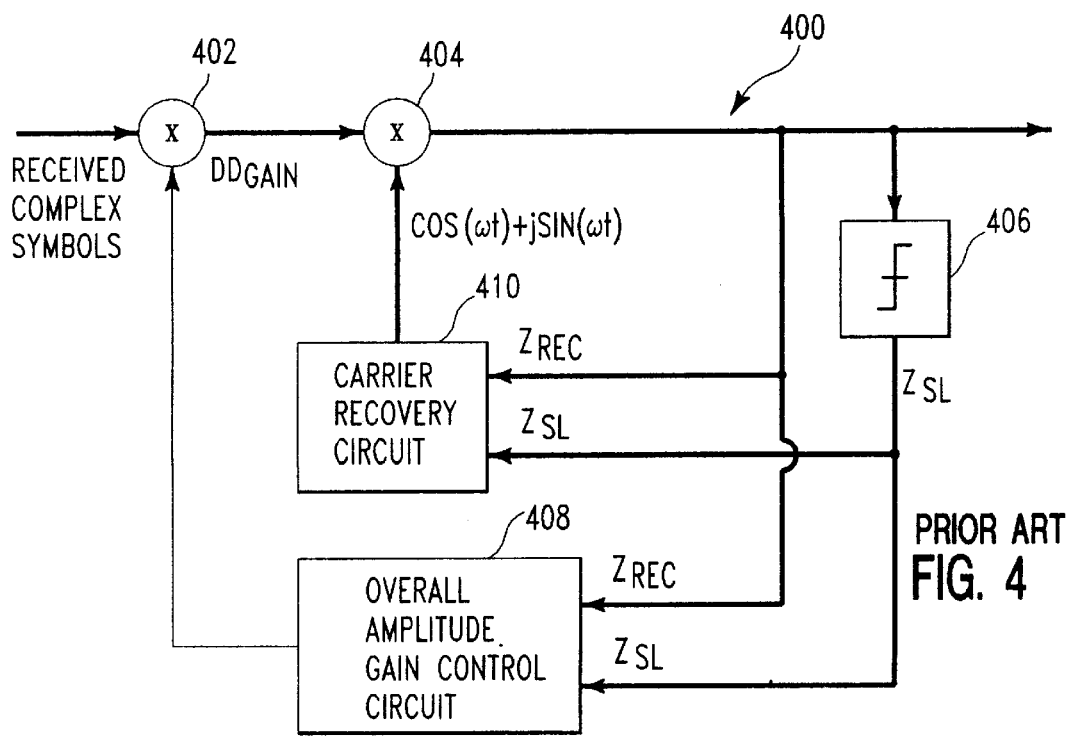
FIG. 4 illustrates a known carrier recovery circuit.
Figure 2A:
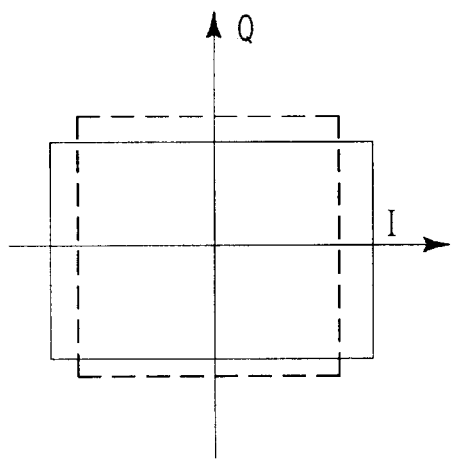
FIGS. 2A and 2B illustrate the effect of amplitude imbalances on the shape of a QAM constellation.
Figure 2B:
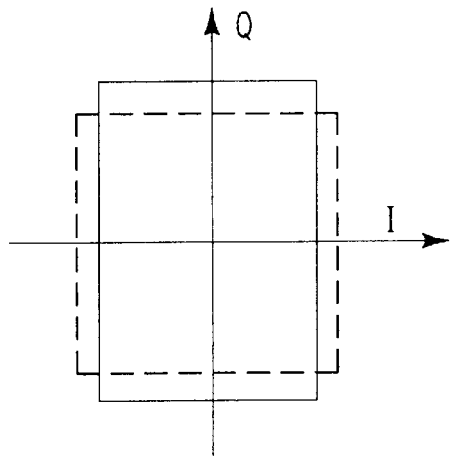
Figure 5:
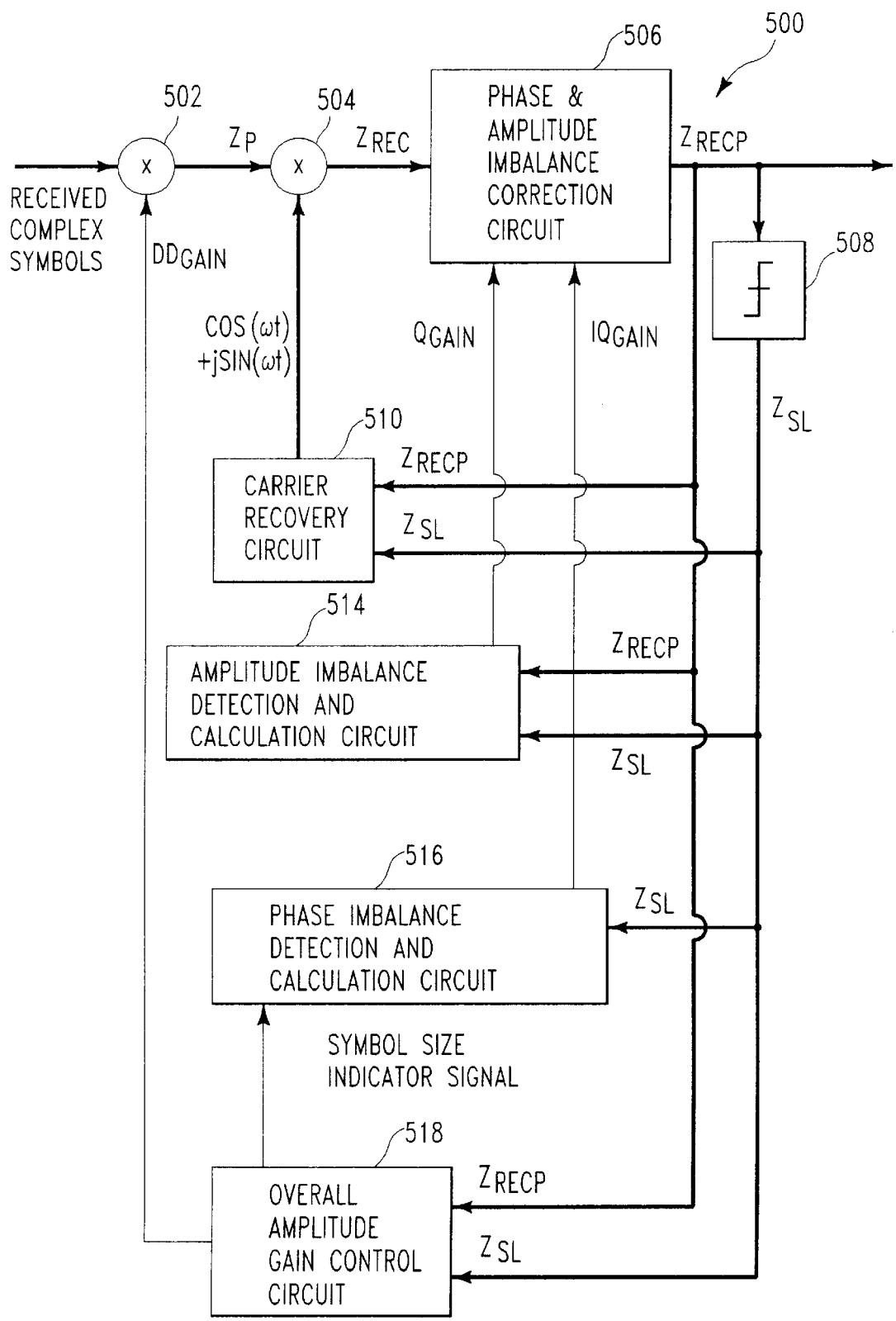
FIG. 5 illustrates a demodulator system implemented in accordance with an exemplary embodiment of the present invention.

FIG. 5 illustrates a demodulator system implemented in accordance with the present invention. Unlike the known demodulator system illustrated in FIG. 4, the demodulator system 500 of the present invention includes circuitry for detecting and correcting both amplitude and phase imbalances. The system 500 also includes a decision directed carrier recovery loop and an overall decision directed gain control loop.

Figure 6A:
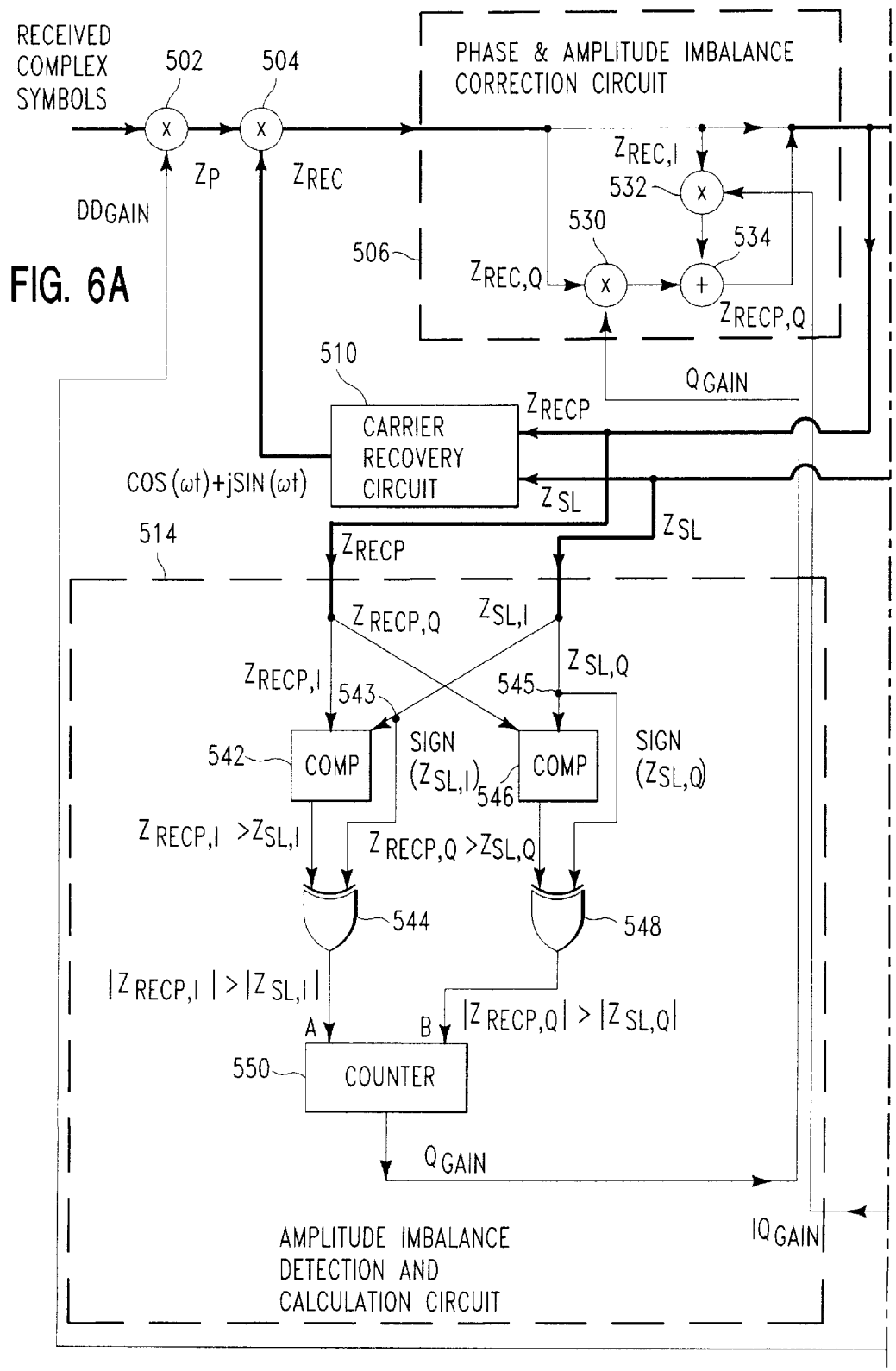
Figure 6:
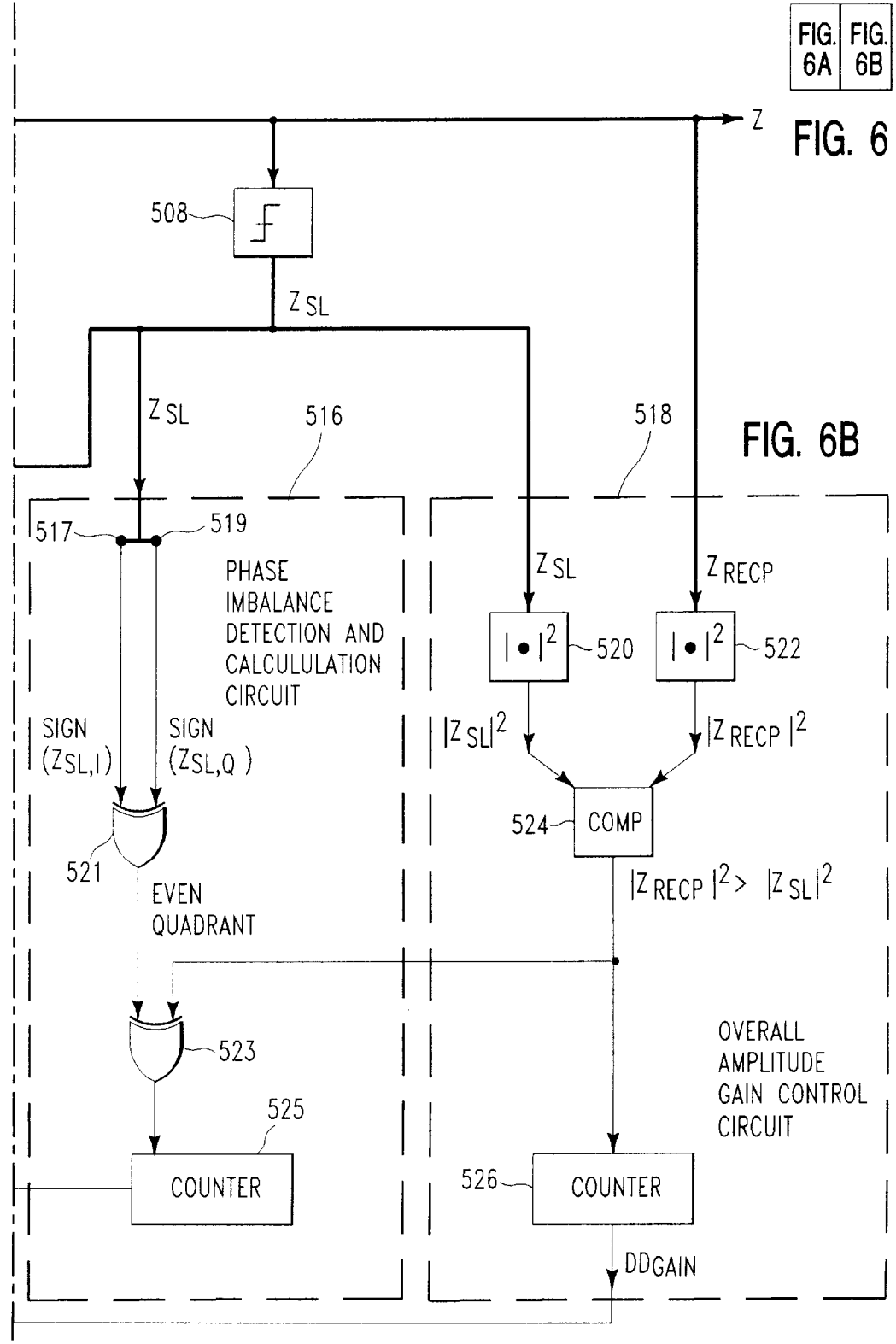
Figure 7:
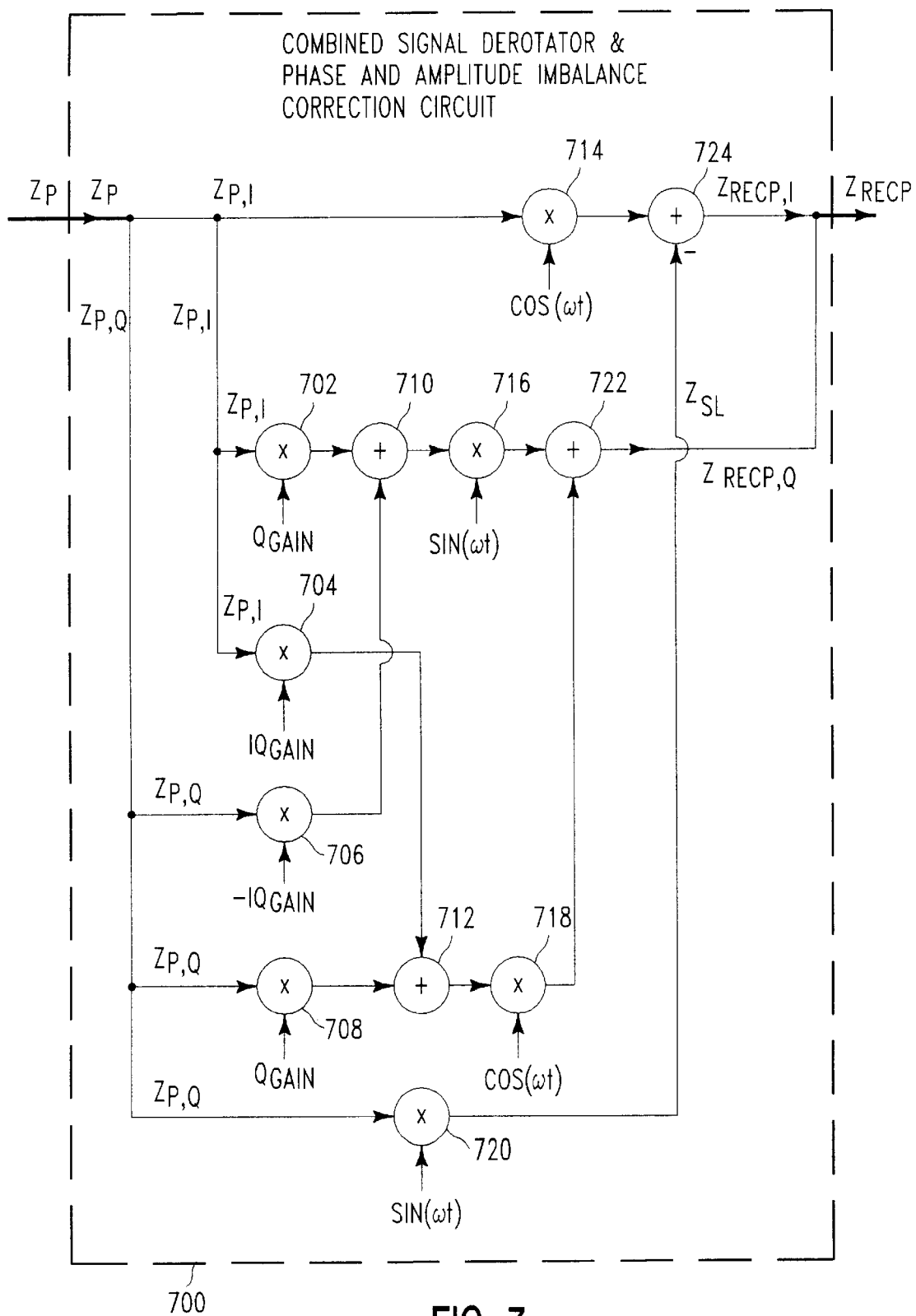
FIG. 7 illustrates circuitry suitable for use in the demodulator system illustrated in FIGS. 5 and 6.

In FIGS. 5–7, bold lines are used to illustrate complex signals while non-bold lines are used to illustrate real signals.

The system 500, illustrated in FIG. 5, includes a half-complex multiplier 502, mixer 504, slicer 508, and a carrier recovery circuit 510. These components 502, 504, 508, and 510 may be implemented using circuitry which is the same as or similar to the corresponding circuitry of the known system illustrated in FIG. 4. In addition, the system 500, includes a phase and amplitude imbalance correction circuit 506, an amplitude imbalance detection and calculation circuit 514, a phase imbalance detection and calculation circuit 516 and an overall amplitude gain control circuit 518.

The components of the system 500 illustrated in FIG. 5 are arranged to form a series of inner and outer control loops. The outermost control loop is the overall amplitude gain control loop which is responsible for controlling the overall gain of the system 500. The overall amplitude gain control loop comprises the half-complex multiplier 502, the mixer 504, phase and amplitude imbalance correction circuit 506, slicer 508 and overall amplitude gain control circuit 518. The overall amplitude gain control circuit 518 generates the decision directed gain control signal ($DD_{GAIN}$) as a function of the output of the slicer 508 and the received symbols $Z_{RECP}$ which have been processed by the phase and amplitude imbalance correction circuit 506.

The carrier recovery loop includes the mixer 504, the phase and amplitude imbalance correction circuit 506, slicer 508 and carrier recovery circuit 510. The carrier recovery circuit 510 is responsible for controlling the mixer 504. The carrier recovery circuit 510 has as its inputs the sliced symbols $Z_{SL}$ output by the slicer 508 and the received and processed symbols $Z_{RECP}$ output by the phase and amplitude imbalance correction circuit 506.

In accordance with the present invention amplitude imbalance detection and correction is achieved through the use of a decision directed amplitude imbalance control loop which includes the phase and amplitude imbalance correction circuit 506, the slicer 508 and amplitude imbalance detection and calculation circuit 514. The amplitude imbalance detection and calculation circuit 514 is responsible for generating an estimate of the size of any amplitude imbalance that may exist between the I and Q signal components of the received signal and for generating a signal $Q_{GAIN}$. The signal $Q_{GAIN}$ is used to control the phase and amplitude imbalance correction circuit 506 to adjust the relative amplitudes of the I and Q signal components to thereby correct for detected amplitude imbalances.

In addition to amplitude imbalance detection and correction, the present invention also supports phase imbalance detected and correction. Detection and correction of phase imbalances is achieved through the use of a decision direction phase imbalance detection and correction control loop. The phase imbalance detection and correction control loop comprises the phase and amplitude imbalance correction circuit 506, slicer 508 and phase imbalance detection and calculation circuit 516. In accordance with the present invention, the phase imbalance detection and calculation circuit 516 detects phase imbalances between the I and Q signal components as a function of the sliced symbols output by the slicer 508 and a symbol size indicator signal supplied by the overall amplitude gain control circuit 518. In addition, the phase imbalance detection and calculation circuit 516 generates a control signal, $IQ_{GAIN}$ which is used to control the phase and amplitude imbalance correction circuit 506 to correct detected phase imbalances as will be discussed below.

FIG. 6 is a more detailed illustration of the system 500 of the present invention. As illustrated in FIG. 6, the overall amplitude gain control circuit 518 comprises first and second squaring circuits 520, 522 for generating a representation of the magnitude squared of the complex sliced symbol values $Z_{SL}$ and the received and processed symbol values $Z_{RECP}$, respectively. The first and second squaring circuits 520, 522 may be implemented by squaring the real and imaginary signal components and summing the squares. In addition, the overall amplitude gain control circuit 518 includes a comparator 524 for generating, on a symbol by symbol basis, an output which indicates whether or not the magnitude of the received and processed symbol value $Z_{RECP}$ exceeds the magnitude of the sliced symbol value $Z_{SL}$ for the corresponding symbol. In the FIG. 6 embodiment, if the magnitude of the received and processed symbol value $Z_{RECP}$ is greater than the magnitude of the sliced symbol value $Z_{SL}$ for the corresponding symbol, the output of the comparator 524 will be a 1 indicating that the overall signal amplitude is too large and needs to be reduced, e.g., by decreasing $DD_{GAIN}$. In the event that the magnitude of the received and processed symbol value $Z_{RECP}$ does not exceed the magnitude of the corresponding sliced symbol value, the output of the comparator 524 will be zero which, in most cases, indicates that the overall amplitude of the received signal is too small and should be increased, e.g., by increasing $DD_{GAIN}$.

The output of the comparator 524 is a symbol size indicator signal which is supplied to a corresponding signal input of the phase imbalance detection and calculation circuit 516 and to the counter 526. The counter 526 generates the signal $DD_{GAIN}$ as a function of the symbol size indicator signal. In the illustrated embodiment, the signal $DD_{GAIN}$ is reduced by a small fixed amount (delta) each time the comparator 524 outputs a 1, e.g., each time it is determined that a processed symbol has been received which has a magnitude that exceeds the sliced symbol value. Similarly, each time the comparator 526 output a zero, the signal $DD_{GAIN}$ is increased by a small fixed amount (delta).

Increasing or decreasing the value of the signal $DD_{GAIN}$, is performed by the counter 526, in one embodiment, using a fixed step size, $\Delta_{DDGAIN}$. In order to insure that the values of the signal $DD_{GAIN}$ do not get excessively large or small, e.g., as the result of a temporary signal noise condition, saturation arithmetic is used to implement the counter 526. That is, the overall range for the control signal $DD_{GAIN}$ is limited to a preselected range, e.g., from 0.9 to 1.1.

Since the gain $DD_{GAIN}$ affects the magnitude of all constellation points equally, its effect is independent of a constellation's orientation. Thus, the half-complex multiplier 502 may be placed before or after the complex derotator 504 used for carrier recovery. However, implementing it before the derotator 504, as illustrated in FIGS. 5 and 6, has the advantage of avoiding the introduction of delays into the carrier recovery loop that would result from placing the multiplier 502 after the complex derotator 504.

Having described the operation of the overall gain control loop included in the system 500, the new and novel phase and amplitude control circuits of the present invention will be described.

In accordance with the present invention, a phase and amplitude imbalance correction circuit 506 is inserted into the carrier recovery loop following the complex derotator 504 and preceding the slicer 508 and carrier recovery circuit 510.

The phase and amplitude imbalance correction circuit 506 includes first and second real multipliers 530, 532 and a summer 534. Thus, in addition to the half-complex multiplier 502, the circuit 500 includes two additional gain controlled multipliers, i.e., the first and second multiplier 530, 532. The first multiplier 530 is used for correcting amplitude imbalances. It receives as its input one component of the received baseband signal $Z_{REC}$. In the case of the illustrated embodiment, the Q signal component $Z_{REC,Q}$ is supplied to a first input of the multiplier 530. An amplitude imbalance gain control signal $Q_{GAIN}$ is supplied to a second input of the multiplier 530. The signal $Q_{GAIN}$ is used to adjust the amplitude of the Q signal component. Since the amplitude of the I signal component is unaffected by the gain applied by the multiplier 530 to the Q signal component, the multiplier 530 provides a mechanism for correcting amplitude imbalances between the I and Q signal components. This correction is done as a function of the $Q_{GAIN}$ signal generated by the amplitude calculation circuit 514.

Phase imbalance is corrected in accordance with one embodiment of the present invention by adding a portion of one of the I and Q signal components to the other one of the I and Q signal components. In the illustrated embodiment, the summer 534 and the second multiplier 532 serve this function. As illustrated the second summer 532 receives as a first input, the I signal component of the complex received signal $Z_{REC}$. This I signal component is represented using the notation $Z_{REC,I}$. A second input of the second multiplier 532 receives the gain control signal $IQ_{GAIN}$ output by the phase imbalance detection and calculation circuit 516. The multiplier 532 multiplies the signal $Z_{REC,I}$ and the phase correction signal $IQ_{GAIN}$ to generate a signal which is then added by the summer 534 to the quadrature signal output by the first multiplier 530. Thus, the signal $IQ_{GAIN}$ is used to determine how much of the I signal component will be added to the Q signal component to correct a detected phase imbalance.

Generation of the signals $Q_{GAIN}$ and $IQ_{GAIN}$ used to correct amplitude and phase imbalances, respectively, will now be described in detail. The amplitude imbalance detection and calculation circuit 514 is responsible for generating the amplitude imbalance correction signal IQ gain as a function of the symbol values included in the complex signal $Z_{RECP}$, output by the phase and amplitude imbalance correction circuit 506, and the sliced symbol values $Z_{SL}$ output by the slicer 508.

The amplitude imbalance detection and calculation circuit 514 is responsible for examining the I and Q components separately and determining, e.g., by comparing the magnitude of the received and processed signal component values $|Z_{RECP,I}|$ and $|Z_{RECP,Q}|$ to the magnitude of the corresponding sliced magnitude values $|Z_{SL,I}|$ and $|Z_{SL,Q}|$, respectively, to determine what amplitude corrections need to be made. If $|Z_{RECP,I}|>|Z_{SL,I}|$ it indicates that the I component of the received signal is too big and should be reduced in size. If $|Z_{RECP,Q}|>|Z_{SL,Q}|$ it indicates that the Q component of the received signal is too big and should be reduced in size.

While a variety of circuits, including absolute value circuits, may be used in making the determination as to whether the I and Q components are too big, one embodiment of the present invention avoids the use of absolute value circuits and uses simpler to implement circuitry. In one embodiment, the present invention takes advantage of the fact that it is more efficient in terms of hardware costs, to compare $Z_{RECP,I}$ with $Z_{SL,I}$ and then examine what their sign is. Since both $Z_{RECP,I}$ and will have the same sign, one need only look at the sign of $Z_{SL,I}$.

That is, if:

$$Z_{RECP,I}>Z_{SL,I} \text{ and } Z_{SL,I}>0,$$

then $$|Z_{RECP,I}|>|Z_{SL,I}|;$$

similarly, if $$Z_{RECP,I}>Z_{SL,I} \text{ and } Z_{SL,I}<0,$$

then $$|Z_{RECP,I}|<|Z_{SL,I}|.$$

In accordance with the FIG. 5 embodiment, two's complement representation is used to represent the signal component values. To determine the SIGN of a signal, i.e., if the signal has a positive or negative value, the sign bit is examined. In the FIG. 5 embodiment, a one in the sign bit represents a negative number while a zero represents a nonnegative number. In block 514 the dot on the lines $Z_{SL,I}$ and $Z_{SL,Q}$ represent the operation of taking and outputting the sign bit to be used as the inputs to the XOR gate 544, 548.

The same type of calculation discussed above in regard to determining if the I signal component is too large may be used to process the Q signal component $Z_{RECP,Q}$ and determine if it is too large.

Referring now to FIG. 6, it can be seen that the amplitude imbalance detection and calculation circuit 514 includes first and second comparators 542, 546, first and second sign operators 543, 545, first and second exclusive OR (XOR) gates 544, 548, and a counter 550 used for incrementing and decrementing the value of the signal $Q_{GAIN}$ as a function of the outputs of the XOR gates 544, 548.

As illustrated, the first comparator 542 receives the I signal component $Z_{RECP,I}$ of the complex signal $Z_{RECP}$ and the I component $Z_{SL,I}$ of the complex signal $Z_{SL}$ output by the slicer 508. The first comparator 542 compares these two signals and generates an output signal which has a value of 1 when $Z_{RECP,I}>Z_{SL,I}$. The output of the first comparator 542 is coupled to the first input of the first XOR gate 544. The first sign operator 543 receives as its input signal the I component $Z_{SL,I}$ of the signal $Z_{SL}$. The sign operator 543 outputs a one bit signal which assumes the value of 0 when $Z_{SL,I}$ is positive and 1 when it is negative. The output of the first sign operator 543 is supplied to a second input of the first XOR gate 544. The output of the first XOR gate 544 as a value which will be 1 when $|Z_{RECP,I}|>|Z_{SL,I}|$, i.e., when the I signal component $Z_{RECP,I}$ of the received and processed signal $Z_{RECP}$ is too large and 0 at other times.

The circuitry used in determining if the Q signal component is too large is similar to that used for processing the I signal component. As illustrated, the second comparator 546 receives the Q signal component $Z_{RECP,Q}$ of the complete signal $Z_{RECP}$ and the Q component $Z_{SL,Q}$ of the complex signal $Z_{SL}$. The second comparator 546 compares these two signals and generates an output signal which has a value of 1 when $Z_{RECP,Q}>Z_{SL,Q}$. The output of the second comparator 546 is coupled to the first input of the second XOR gate 548. The second sign operator 545 receives as its input signal the Q component $Z_{SL,Q}$ of the signal $Z_{SL}$. The sign operator 545 outputs a one bit signal which assumes the value of 0 when $Z_{SL,Q}$ is positive and 1 when it is negative. The output of the second sign operator 545 is supplied to a second input of the second XOR gate 548. The output of the second XOR gate 548 is a value which will be 1 when $|Z_{RECP,Q}| > |Z_{SL,Q}|$, i.e., when the Q signal component $Z_{RECP,Q}$ of the received and processed signal $Z_{RECP}$ is too large and 0 at other times.

Thus, the outputs of the first and second XOR gates 544, 548 will be asserted when the I and Q signal components, respectively, of the received and processed signal $Z_{RECP}$ are too large in magnitude or absolute value.

The outputs of the first and second XOR gates 544, 548 are coupled to the input of a counter 550 which is incremented or decremented in response to the value of the counter input signals each time a new received symbol is processed. As with the counter 526 of the overall amplitude gain control circuit 518, saturated arithmetic is used in implementing the counter 550 to insure that the signal $Q_{GAIN}$ assumes values limited to a preselected range, e.g., a range from 0.9 to 1.1. Incrementing and decrementing of the counter may be done using a fixed step size, $\Delta Q_{GAIN}$.

The output of the counter 550, the signal $Q_{GAIN}$ assumes the value of the counter 550. In the embodiment, illustrated in FIG. 5, the value of the counter is adjusted in response to the counter input signals once for each received symbol according to the following logic table:

| INPUTS AB | COUNTER VALUE MODIFICATION |
|---|---|
| 00 | Do Nothing |
| 01 | Decrement |
| 10 | Increment |
| 11 | Do Nothing |

Hence, if the conditions on the left side of the following statement is satisfied, the condition on the right side of the →symbol is performed:

$(|Z_{RECP,I}| > |Z_{SL,I}|)$ and $(|Z_{RECP,Q}| \leq |Z_{SL,Q}|) \rightarrow$ increase $Q_{GAIN}$;

$(|Z_{RECP,I}| \leq |Z_{SL,I}|)$ and $(|Z_{RECP,Q}| > |Z_{SL,Q}|) \rightarrow$ decrease $Q_{GAIN}$;

$(|Z_{RECP,I}| > |Z_{SL,I}|)$ and $(|Z_{RECP,Q}| > |Z_{SL,Q}|) \rightarrow$ do nothing;

$(|Z_{RECP,I}| \leq |Z_{SL,I}|)$ and $(|Z_{RECP,Q}| \leq |Z_{SL,Q}|) \rightarrow$ do nothing.

The above logic results in $Q_{GAIN}$ being left unaltered in the case where both the I and Q signal components are too large or too small. The correcting of such conditions is addressed by the operation of the overall amplitude gain control circuit 518 which adjusts the signal $DD_{GAIN}$ as required.

Thus, operation of the amplitude imbalance detection and calculation circuit 514, in combination with the phase and amplitude imbalance correction circuit 506, has the effect of bringing both the I and Q signal components to the same amplitude thereby correcting or reducing any amplitude imbalances that may exist.

Figure 3A:
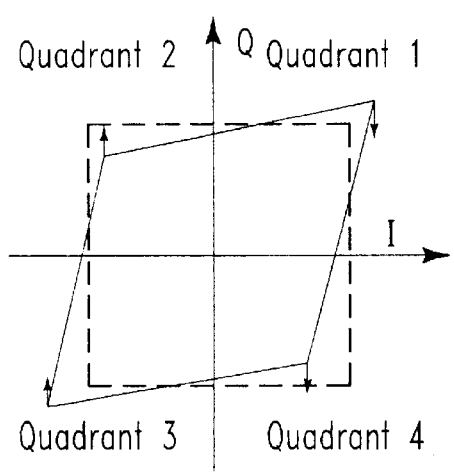
FIGS. 3A and 3B illustrate the effect of phase imbalances on the shape of a QAM constellation.
Figure 3B:
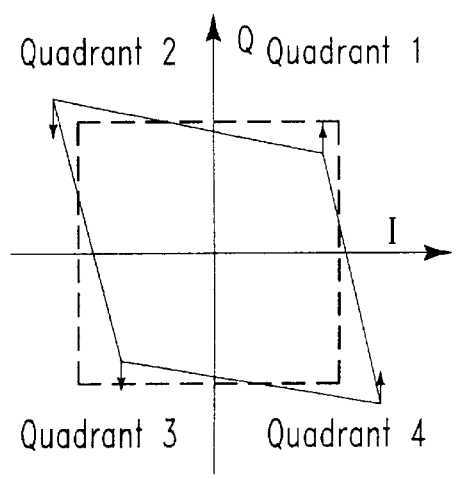

Detection and correction of phase imbalances will now be discussed. FIGS. 3A and 3B illustrate the effect of phase imbalance on the shape of the received constellation. In FIGS. 3A and 3B the outline of the ideal constellation is shown in a dashed line. The outline of the received constellation is shown in a solid line. Note that the phase imbalance causes the constellation to assume a diamond shape having one of the two illustrated orientations. The phase imbalance can be viewed as an unwanted cross coupling between the I and Q signal components. In order to correct the phase imbalance it can be assumed that one of the I and Q components has been contaminated by the other. For purposes of explanation, it will be assumed that the Q component has been contaminated by the I signal component. However, for phase correction purposes the opposite assumption could be made and the phase correction technique of the present invention would still work.

Accordingly, the received Q signal component may be expressed as:

$$Z_{REC,Q} = Z_{ACTUAL,Q} + K_{unwanted} * Z_{REC,I}.$$

where:

$Z_{REC,Q}$ is the Q component of the signal output by the derotator 504;

$Z_{ACTUAL,Q}$ is the Q component of the received signal in the absence of phase imbalance;

$K_{unwanted}$ is a parameter which represents the amount of the I signal component that is being added to the Q signal component; and $Z_{REC,I}$ represents the I component of the received signal output by the derotator 504.

In accordance with the present invention, the second multiplier 532 and the summer 534, of the phase and amplitude imbalance correction circuit 506, are used to add a component of $Z_{REC,I}$ into the Q signal component, in an attempt to render the net I into Q gain zero. That is, in accordance with the present invention:

$$Z_{RECP,Q} = Z_{REC,Q} + K_{unwanted} * Z_{REC,I} + IQ_{GAIN} * Z_{REC,I}$$

where $Z_{RECP,Q}$ represents the Q signal component of the complex received and processed signal $Z_{RECP}$ output by the phase and amplitude imbalance correction circuit 506.

In FIG. 3A the net addition of the I component into the Q component is too large. Note that in the FIG. 3A case, as the I signal component increases positively, the Q signal component deviates from its target values more and more positively. In FIG. 3B the net I component into Q component is too small. Note that in the FIG. 3B case as the I signal component increases positively, the Q signal component deviates from its target values more and more negatively.

By examining the relationship between the magnitude of a received symbol and the target (sliced) symbol corresponding thereto, and ascertaining which of the four quadrants the symbol is located in, it is possible to determine whether the phase imbalance is of the type illustrated in FIG. 3A or the type illustrated in FIG. 3B and the direction in which the symbol value must be adjusted to reduce the detected phase imbalance. The arrows at the corners of each of the diamond shaped constellations in FIGS. 3A and 3B illustrate the direction in which a symbol in the corresponding quadrant must be pulled to reduce the phase imbalance that resulted in the out of square constellation shape.

In the embodiment illustrated in FIG. 6, phase imbalance detection and calculation circuit 516 determines the quadrant in which a symbol being processed is located by using the sign bits of the I and Q components of $Z_{SL}$. However, the sign bits of the I and Q components of $Z_{REC}$ could also be used.

The phase imbalance detection and calculation circuit 516 includes first and second signal operators 517, 519, represented by dots, and first and second XOR gates 521, 523. The first and second sign operators 517, 519 receive the I and Q signal components $(Z_{SL,I})$, $(Z_{SL,Q})$, respectively, of the complex signal $Z_{sl}$. Each of the sign operators 517, 519 determine the sign of the input signals supplied thereto and output a one bit signal indicative of the sign of the input signal. When an input signal to a sign operator 517, 519 is positive the output of the sign operator will be zero. However, when an input signal to a sign operator 517, 519 is negative, the output of the sign operator will be zero.

The output of the first and second sign operators 517, 519 are supplied to the first XOR gate 521. The output of the XOR gate 521 will be asserted when a received symbol $Z_{REC}$ being processed, corresponding to $Z_{sI}$, is located in an even quadrant, i.e., either quadrant 2 or 4 of FIGS. 3A or 3B. However, the output of the XOR gate 521 will assume a value of 0 when a received symbol $Z_{REC}$ being processed, corresponding to $Z_{SI}$, is located in an odd quadrant, i.e., either quadrants 1 or 3 of FIGS. 3A or 3B.

In other words, when two's complement representation is being used:

SIGNBIT($Z_{sI,I}$)XOR SIGNBIT($Z_{sI,Q}$) is 1 for an even quadrant (i.e., the I and Q signal components have opposite signs); and SIGNBIT($Z_{sI,I}$)XOR SIGNBIT($Z_{sI,Q}$) is 0 for an odd quadrant (i.e., the I and Q signal components have the same signs).

In order to generate an increment/decrement signal used to control the adjustment of the signal $IQ_{GAIN}$, the quadrant indicator signal output by the first XOR gate 521 is supplied to a first input of the second XOR gate 523. The second XOR gate 523 receives at a second input the signal output by the comparator 524 which is asserted when the magnitude of $Z_{RECP}$ is greater than the magnitude of $Z_{SL}$. The output of the second XOR gate 523 is a signal which will be asserted when the current value of the $IQ_{GAIN}$ is too big and needs to be reduced to correct a detected phase imbalance.

The output of the second XOR gate 523 is supplied to the input of a counter 525. A value stored in the counter 525, representing the signal $IQ_{GAIN}$ which is generated by the counter 525 is incremented or decremented in response to the signal output by the second XOR gate 523 once for each symbol that is processed. That is, the value of the signal $IQ_{GAIN}$ is decremented when the output of the XOR gate 523 is asserted (1) indicating that the value of $IQ_{GAIN}$ is too large and incremented when the output of the XOR gate 523 is zero (0) indicating that the value of $IQ_{GAIN}$ is too small.

Thus, the signal $IQ_{GAIN}$ is adjusted as follows:

$|Z_{RECP}^2| > |Z_{SL}^2|$ and $Z_{SL}$ is in the first or third quadrants→decrease $IQ_{GAIN}$;

$|Z_{RECP}^2| > |Z_{SL}^2|$ and $Z_{SL}$ is in the second or fourth quadrants→ increase $IQ_{GAIN}$;

$|Z_{RECP}^2| \leq |Z_{SL}^2|$ and $Z_{SL}$ is in the first or third quadrants→increase $IQ_{GAIN}$;

$|Z_{RECP}^2| \leq |Z_{SL}^2|$ and $Z_{SL}$ is in the second or fourth quadrants→ decrease $IQ_{GAIN}$.

The above described adjustment to the signal $IQ_{GAIN}$ has the effect of creating the correct cross-component compensation gain and effectively causes the I and Q axes to become orthogonal, thereby correcting the phase unbalance. Increasing or decreasing the signal $IQ_{GAIN}$, in the illustrated embodiment, is performed using a fixed preselected step size $\Delta_{IQGAIN}$. The counter 525 used for incrementing/decrementing the value of the signal $IQ_{GAIN}$ uses saturated arithmetic. In one particular embodiment, the overall range for the control signal $IQ_{GAIN}$ is limited to a range of, e.g., −0.1 to +0.1. Thus, the $IQ_{GAIN}$ value may be positive or negative, depending upon whether the received constellation locks up as illustrated in FIGS. 3A or 3B.

FIG. 7 illustrates a combined signal derotator and phase and amplitude imbalance correction circuit 700. The circuit 700 includes first through eighth real multipliers 702, 704, 706, 708, 714, 716, 718, 720 and first through fourth summers 710, 712, 722, 724 which are coupled together as illustrated in FIG. 7. The derotator in the FIGS. 5 and 6 embodiments may be implemented as a complex multiplier. Such complex multipliers may incorporate four real multipliers used to implement the complex multiplier as a single unit. In FIG. 7, the derotator portion of the circuit 700 is implemented using four real multipliers 714, 716, 718, 720 which serve the function of the single complex multiplier normally used in a signal derotator.

The circuit 700 may be directly substituted for the derotator 504 and the phase and amplitude imbalance correction circuit illustrated in FIGS. 5 and 6. The circuit 700 has the advantage of removing the $IQ_{GAIN}$ and $Q_{GAIN}$ multipliers 532, 530 and the adder 534 from within the carrier recovery loop. As discussed above, in the case of carrier recovery it is important that delays be minimized. In particular, it is important that delays between the derotator and the output of soft and sliced decisions be as short as possible since these outputs are used to update the complex sinusoid $\cos(\omega t) + j\sin(\omega t)$ fed to the derotator.

Note that in FIGS. 5 and 6, the I and Q components of the output symbols $Z_{RECP}$ which have been corrected for amplitude and phase imbalances can be expressed as:

$$Z_{RECP,I} = (Z_{P,I} * \cos(\omega t)) - (Z_{P,Q} * \sin(\omega t));$$

$$Z_{RECP,Q} = [((Z_{P,I} * \sin(\omega t)) + (Z_{P,Q} * \cos(\omega t))) * Q_{GAIN}] + [((Z_{P,I} * \cos(\omega t)) - (Z_{P,I} * \sin(\omega t))) * IQ_{GAIN}]; \text{ and}$$

$$Z_{RECP,Q} = \cos(\omega t) * (Z_{P,Q} * Q_{GAIN} + Z_{P,I} * IQ_{GAIN}) + \sin(\omega t) * (Z_{P,I} * Q_{GAIN} - Z_{P,Q} * IQ_{GAIN});$$

where:

$Z_p$ is the complex passband signal following the decision-directed AGC multiplier 502;

$Z_{P,I}$ and $Z_{P,Q}$ are the real and imaginary parts of the complex signal $Z_p$, respectively;

$\cos(\omega t) + j\sin(\omega t)$ is the complex carrier recovery signal fed into the derotator 504; and $\cos(\omega t)$ and $\sin(\omega t)$ are the real and imaginary components, respectively, of the complex carrier recovery signal.

The signals $Z_{RECP,I}$ and $Z_{RECP,Q}$, which are the I and Q components of the complex signal $Z_{RECP}$, output by the circuit 700, have the same equations set forth above in regard to the FIGS. 5 and 6 embodiments. However, in contrast to the FIGS. 5 and 6 embodiments, in the FIG. 7 embodiment the phase and amplitude imbalance corrections are done ahead of carrier recovery. This results in good hardware performance.

The phase and amplitude detection and correction method and apparatus of the present invention may be used in a wide variety of applications. Some exemplary applications include QPSK and QAM receivers used, e.g., in a cable modem or digital CATV systems.

In one particular embodiment of the present invention, the amplitude and phase imbalance detection and correction circuits of the present invention are activated only upon achieving a carrier recovery signal lock. In addition, they are deactivated when a carrier recovery signal lock is lost. Accordingly, in such an embodiment, the amplitude and phase imbalance correction circuits operate only when supplied with sliced symbols which can be used in making useful phase and amplitude imbalance determinations and corrections.

What is claimed is:

1. A method of processing a complex signal including in-phase and quadrature phase signal components, the complex signal having amplitude imbalances resulting from separate processing of the in-phase and quadrature-phase signal components of said complex signal in at least one of a transmitter and a receiver, the method comprising the steps of:

receiving the complex signal;

performing a slicing operation as a function of a received symbol value, included in the received complex signal, to generate a sliced symbol value;

detecting said amplitude imbalances between the in-phase and quadrature phase signal components included in the received complex signal by processing said received symbol value and a sliced symbol value generated therefrom; and performing an amplitude imbalance correction operation on the complex signal being received to reduce detected amplitude imbalances.

2. The method of claim 1, wherein the amplitude imbalance correction operation involves the step of:

adjusting the gain of a first one of the in-phase and quadrature phase signal components by a first amount which is different from a second amount by which a second one of the in-phase and quadrature phase signal components is adjusted, the second one of the in-phase and quadrature phase signal components being different than said first one of the in-phase and quadrature phase signal components.

3. The method of claim 2, wherein the signal being received includes a plurality of complex symbol values, the method further comprising the steps of:

performing a slicing operation for each received complex symbol value to generate a sliced symbol value corresponding to each received symbol value; and wherein the step of detecting said amplitude imbalances is performed as a function of a plurality of sequentially received complex symbol values and the sliced symbol values corresponding thereto, said received symbol value being one of said sequentially received symbol values.

4. The method of claim 3, further comprising the step of:

generating an amplitude imbalance control signal by modifying an amplitude imbalance control signal value as a function of said received complex symbol value and a sliced symbol value generated therefrom; and using the generated amplitude imbalance control signal to control the amount of adjustment made to the gain of the one of the in-phase and quadrature phase signal components.

5. The method of claim 4, further comprising the step of:

adjusting the overall gain of the complex signal being received by modifying the gain of both the I and Q signal components by an equal amount.

6. The method of claim 5, wherein the step of modifying an amplitude imbalance control signal value includes the step of incrementing or decrementing the amplitude imbalance control signal value by a fixed amount.

7. The method of claim 2, further comprising the step of:

processing the signal being received to detect phase imbalances between the in-phase and quadrature phase signal components included therein; and performing a phase imbalance correction operation on the complex signal being received to reduce the detected phase imbalances.

8. The method of claim 7, wherein the step of performing a phase imbalance correction operation involves the step of:

adding a portion of one of the in-phase and quadrature phase signal components to the other one of the in-phase and quadrature phase signal components.

9. The method of claim 1, further comprising the step of:

processing the signal being received to detect phase imbalances between the in-phase and quadrature phase signal components included therein; and performing a phase imbalance correction operation to reduce the detected phase imbalances.

10. The method of claim 9, wherein the step of performing a phase imbalance correction operation involves the step of:

adding a portion of one of the in-phase and quadrature phase signal components to the other one of the in-phase and quadrature phase signal components.

11. A method of processing a complex signal including in-phase and quadrature phase signal components, the complex signal having amplitude imbalances resulting from separate processing of the in-phase and quadrature phase signal components of said complex signal in at least one of a transmitter and a receiver, the method comprising the steps of:

receiving the complex signal;

performing a slicing operation as a function of a received symbol value including in said complex signal to generate a sliced symbol value;

using said sliced symbol value to detect said phase imbalances between the in-phase and quadrature phase signal components included in said complex signal; and performing a phase imbalance correction operation on the complex signal being received to reduce phase imbalances between the in-phase and quadrature phase signal components.

12. A method of processing a complex signal including in-phase and quadrature phase signal components, the method comprising the steps of:

processing sliced symbol values generated from the complex signal to detect phase imbalances between the in-phase and quadrature phase signal components of the complex signal; and performing a phase imbalance correction operation on the complex signal being received to reduce phase imbalances between the in-phase and quadrature phase signal components.

13. The method of claim 12, wherein the signal being received includes a plurality of complex symbol values, the method further comprising the step of:

performing a slicing operation for each received complex symbol value to generate said sliced symbol values; and wherein the step of processing the complex signal being received to detect phase imbalances is performed as a function of a plurality of consecutively received complex symbol values and sliced symbol values generated therefrom.

14. The method of claim 12, wherein the phase imbalance correction operation includes the step of:

adding a portion of one of the in-phase and quadrature phase signal components to the other one of the signal components; and wherein the method further comprises the step of:

generating a phase imbalance control signal by modifying a phase imbalance control signal value as a function of the at least one received complex symbol value and a sliced symbol value generated therefrom; and using the generated phase imbalance control signal to control the size of the portion of the one of the in-phase and quadrature phase signal components that is added to the other one of the signal components.

15. The method of claim 14, further comprising the step of:
adjusting the overall gain of the complex signal being received by modifying the gain of both the I and Q signal components by an equal amount.

16. The method of claim 15, wherein the step of modifying a phase imbalance control signal value includes the step of incrementing or decrementing the phase imbalance control signal value by a fixed amount.

17. An apparatus for processing a complex signal including in-phase and quadrature phase signal components, the complex signal having amplitude imbalances resulting from separate processing of the in-phase and quadrature phase signal components of said complex signal in at least one of a transmitter and a receiver, the apparatus including:
a slicer for generating a sliced symbol value for each received symbol value;
an amplitude imbalance detection and calculation circuit coupled to the slicer, for detecting, as a function of generated sliced symbol values, amplitude imbalances between the in-phase and quadrature phase signal components; and
means for adjusting the relative amplitudes of the in-phase and quadrature phase signal components to reduce detected amplitude imbalances.

18. The apparatus of claim 17, further comprising:
a signal derotator for providing the complex signal to a received symbol input of the amplitude imbalance correction circuit.

19. The apparatus of claim 17, further comprising:
a phase imbalance detection and calculation circuit for detecting phase imbalances between the in-phase and quadrature phase signal components, as a function of sliced symbol values, and for generating a phase imbalance correction signal; and
means for reducing phase imbalances in the received signal as a function of the phase imbalance correction signal.

20. The apparatus of claim 19, wherein the means for reducing amplitude imbalances includes:
a multiplier for adjusting a gain of one of the in-phase and quadrature phase signal components included in the received signal.

21. The apparatus of claim 19, wherein the means for reducing phase imbalances includes:
means for adding a portion of one of the in-phase and quadrature phase signal components included in the received signal to the other one of the in-phase or quadrature phase signal components.

22. The apparatus of claim 18, wherein the means for reducing amplitude imbalances includes:
a multiplier for adjusting a gain of one of the in-phase and quadrature phase signal components included in the received signal.

23. An apparatus for processing a complex signal including in-phase and quadrature phase signal components, the complex signal having phase imbalances resulting from separate processing of the in-phase and quadrature phase signal components of said complex signal in at least one of a transmitter and a receiver, the apparatus including:
a phase imbalance detection and calculation circuit for detecting, as a function of a sliced symbol value generated from a received symbol value, phase imbalances between the in-phase and quadrature phase signal components; and
means for reducing phase imbalances coupled to the phase imbalance detection and calculation circuit.

24. The apparatus of claim 23, wherein the means for reducing phase imbalances includes:
a circuit for adding a portion of one of the in-phase and quadrature phase signal components included in the received signal to the other one of the in-phase or quadrature phase signal components.

25. The apparatus of claim 24, further comprising:
a signal derotator for receiving the complex signal; and
a sliver coupled to the signal derotator by the means for reducing phase imbalances.

* * * * *